US009525825B1

(12) United States Patent
Garg et al.

(10) Patent No.: US 9,525,825 B1
(45) Date of Patent: Dec. 20, 2016

(54) DELAYED IMAGE DATA PROCESSING

(71) Applicant: Amazon Technologies, Inc., Reno, NV (US)

(72) Inventors: Parag K. Garg, Woodinville, WA (US); Cody B. Meyer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 14 days.

(21) Appl. No.: 13/626,545

(22) Filed: Sep. 25, 2012

(51) Int. Cl.
*H04N 5/243* (2006.01)

(52) U.S. Cl.
CPC .................................... *H04N 5/243* (2013.01)

(58) Field of Classification Search
CPC H04N 5/23232; H04N 5/2355; H04N 5/2356; H04N 5/355; H04N 5/235; H04N 5/23241; H04N 5/3698; H04N 1/00885; H04N 1/008891; H04N 1/00896; H04N 1/00904; H04N 1/32763; H04N 21/4436; G06T 5/50; G06T 2207/20208; G06T 5/007; G03B 2217/007
USPC ............. 348/211.2–211.3, 207.1, 372, 222.1
See application file for complete search history.

(56) References Cited

U.S. PATENT DOCUMENTS

| | | | | |
|---|---|---|---|---|
| 6,876,393 B1* | 4/2005 | Yokonuma | ......... | H04N 1/00885 348/207.99 |
| 7,876,357 B2* | 1/2011 | Jung | ................. | H04N 1/00068 348/207.1 |
| 2002/0154829 A1* | 10/2002 | Tsukioka | ................ | G06T 5/009 382/254 |
| 2007/0150896 A1* | 6/2007 | Gebhart | ................ | G06F 9/5044 718/104 |
| 2009/0274387 A1* | 11/2009 | Jin | ........................... | G03B 7/00 382/274 |
| 2011/0188744 A1* | 8/2011 | Sun | ........................... | G06T 5/50 382/162 |
| 2011/0292242 A1* | 12/2011 | Imai | .................... | H04N 5/23216 348/229.1 |
| 2012/0026378 A1* | 2/2012 | Pang | .................. | H04N 5/23251 348/333.02 |
| 2012/0069141 A1* | 3/2012 | Sim | ...................... | H04N 5/2355 348/36 |
| 2012/0218442 A1* | 8/2012 | Jandhyala | ................. | G06T 7/20 348/239 |
| 2012/0274830 A1* | 11/2012 | Kameyama | ........ | H04N 5/23209 348/333.02 |
| 2012/0313933 A1* | 12/2012 | Tsukagoshi | .......... | H04N 13/007 345/419 |

(Continued)

*Primary Examiner* — Pritham Prabhakher
(74) *Attorney, Agent, or Firm* — Polsinelli LLP

(57) ABSTRACT

A camera on a computing device can capture a plurality of images, each with a different exposure setting but having the same subject. The images can be stored, at least temporarily, in a memory device on the computing device. The device can determine a time subsequent to the capturing of the images at which to process the plurality of images. For example, the time can be when the camera is not being used and/or when the computing device has sufficient resources (e.g., processing power, battery life, etc.) to process the plurality of images. At the determined time, the computing device can process the plurality of images to generate at least one high dynamic range (HDR) image. The processing of the plurality of images to generate the at least one HDR image can be based at least in part upon combining at least some portions of the plurality of images.

15 Claims, 11 Drawing Sheets

(56) References Cited

U.S. PATENT DOCUMENTS

2013/0006616 A1\* 1/2013 Wakaki ............ H04M 1/72563
704/200

\* cited by examiner

DELAYED IMAGE DATA PROCESSING

BACKGROUND

Computing devices are often used to capture data, such as when capturing an image using a camera on a computing device. An increasingly common feature of modem cameras on computing devices is the option to take high dynamic range (HDR) photographs. Conventional approaches to generating HDR photographs typically involve capturing a plurality of non-HDR photographs and immediately processing the plurality of non-HDR photographs, combining them to generate an HDR photograph. However, the processing of the plurality of photographs to generate the HDR photograph can make the computing device (and the camera on the computing device) slow or unusable because the computing device may be busy using much of its processing power to process the photographs to form the HDR photograph. For example, a user of the computing device (and camera) may want to take multiple HDR photos in a row, but cannot do so because he/she has to wait for each HDR photo to be generated before taking the next one. In another example, the user may have accidentally taken an HDR image incorrectly or inappropriately and thus the user wants to take a correct and appropriate HDR image, but he/she has to wait until the former HDR image is generated. These and other shortcomings of conventional approaches can be detrimental to the overall user experience with HDR photography. As such, an improved approach to handling HDR photography is needed.

BRIEF DESCRIPTION OF THE DRAWINGS

Various embodiments in accordance with the present disclosure will be described with reference to the drawings, in which.

DETAILED DESCRIPTION

Figure 1:
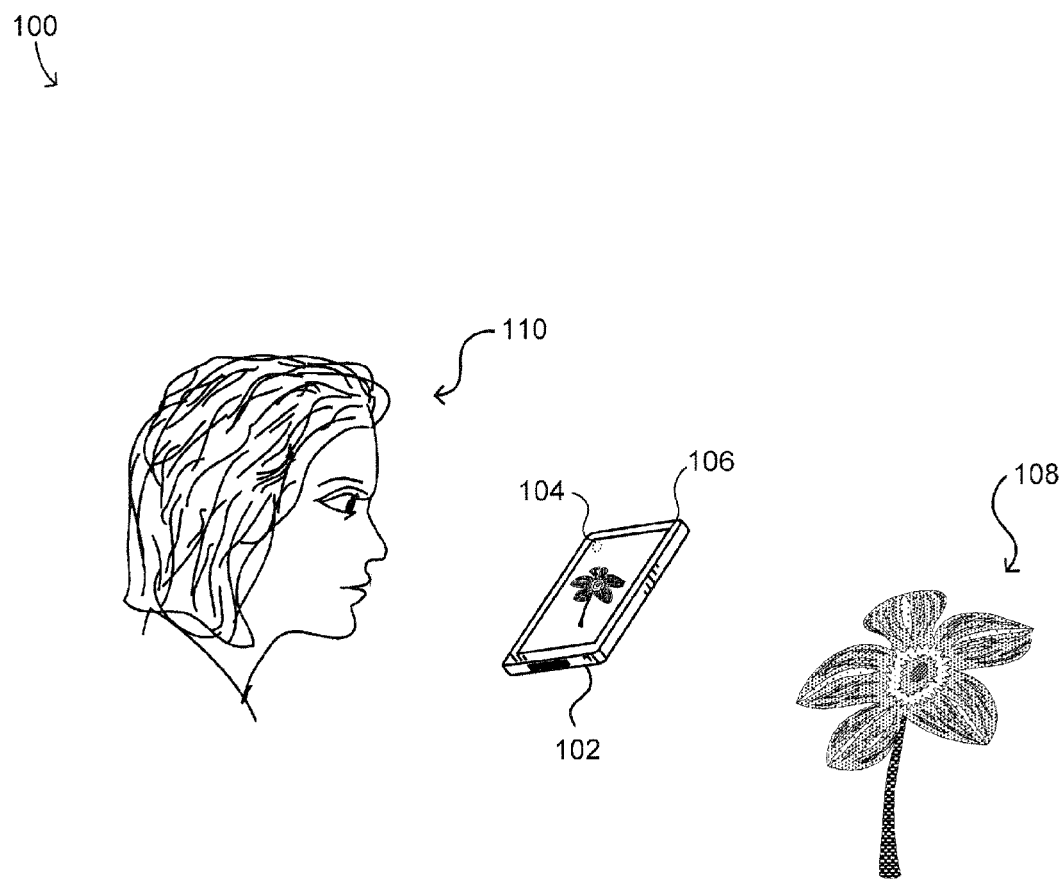
FIG. 1 illustrates an example environment in which aspects of the various embodiments can be utilized.

Systems and methods in accordance with various embodiments of the present disclosure overcome one or more of the above-referenced and other deficiencies in conventional approaches to capturing and processing digital images. In particular, various embodiments can provide delayed image data processing for generating high dynamic range images.

A subject (e.g., person, item, scene, etc.) to be captured in a photograph can have multiple shades, including dark details (e.g., shadow details) and bright details (e.g., highlight details). In other words, due to numerous variable factors such as the amount of sunlight, the amount of artificial lighting, the characteristics of the subject, etc., the subject can have dark and/or bright details at particular portions but not at others. Standard/normal (i.e., non-HDR) photography generally attempts to match the mid-tone of the subject to the mid-lone of the photograph to be taken. In contrast, high dynamic range (HDR) photography attempts to enhance and capture the dark as well as bright details of the subject.

In some embodiments, HDR photography utilizes a plurality of successively shot standard images to create a single HDR image. For example, each of the plurality of images can be taken of the same subject at rapid succession, but each image being taken with a different exposure (e.g., alter the exposure setting of the camera for each image taken). As a result, each image will be of the same subject, but will have different exposures. The amount of exposure affects the amount of light received by the camera lens during each image capture. As such, an image with a short exposure time will tend to be darker (and contain more details about dark areas) whereas an image with a long exposure time will tend to be brighter (and contain more details about brighter areas). The plurality of images, each with a different exposure, can be processed/combined (e.g., stitched together) to form a HDR image having a high dynamic range (i.e., contrast range); the HDR image is of the same subject as the plurality of images, but the HDR image can include even the darkest of regions (e.g., as provided in a dark image from the plurality of images) in conjunction with even the brightest of regions (e.g., as provided in a bright image from the plurality of images). An HDR image can combine a subject's dark intensities, its bright intensities, and everything in between.

A camera on a computing device can be used to capture the plurality of images to generate an HDR image. If the plurality of captured images are processed (e.g., analyzed, combined, etc.) immediately after they are captured, then the computing device (and/or camera on the computing device) can become slow and/or unusable because the computing device may be busy using much of its processing power to process the plurality of images. For example, a user of the computing device (and camera) may want to take multiple HDR images in a row, but cannot do so because he/she has to wait for each HDR image to be generated before taking the next one. In another example, the user may have accidentally taken an HDR image incorrectly/inappropriately and he/she wants to take a correct/appropriate HDR image, but he/she has to wait until the former HDR image is generated.

In some embodiments, the plurality of captured images can be stored in a memory device on the computing device to be processed at a time subsequent to the capturing of the images. For example, the images can be stored in RAM on the computing device after they are captured by the camera. The images can also be written to disk, such as a hard disk drive on the computing device. Since the images are saved, the processing of the images to generate an HDR image can occur at a later time thus freeing up the computing device (and camera) now to perform other tasks. When the computing device determines an appropriate subsequent time (e.g., when the camera is not likely being used, when the camera is not likely to be used, and/or when the computing device has sufficient resources to process the images to generate the HDR image, etc.), then the plurality of images can be processed to generate the HDR image.

In some embodiments, the plurality of captured images can be stored in a memory device on the computing device to be processed by a server at a time subsequent to the capturing of the images. The server can be external to the computing device and can communicate with the computing device via one or more wired and/or wireless networks. For example, after the images are captured by the camera, they can be (stored in RAM/disk and then) transmitted to the server. The computing device is now free to perform other tasks. The server can determine an appropriate time (e.g., when it is not busy with other tasks) to process the plurality of images to generate the HDR image. At the determined time, the server can process the plurality of images to generate the HDR image. The server can transmit back to the computing device the generated HDR image.

FIG. 1 illustrates an example environment in which aspects of the various embodiments can be utilized. The example environment 100 can comprise a computing device 102 and at least one camera 104 on the computing device 102. The computing device 102 can also include a display screen 106. A user 110 of the computing device 102 can use (the at least one camera 104 on) the device 102 to capture one or more images (i.e., photographs, pictures, video). For example, as shown in FIG. 1, the user 110 can use the device 102 to capture an image of a flower 108. In some embodiments, the display screen 106 on the device 102 can act as a view finder for the user 108 to operate the camera 104. Accordingly, when the user 110 is attempting to capture one or more images of the flower, the display screen 106 can act as the view finder to present to the user 110 a flower on the screen 106, such that the user 110 can have an idea of what he/she may capture with the camera 104.

In FIG. 1, the flower 108 can have various dark and light regions. The brightness and/or color intensity of the various areas of the flower 108 can depend on several factors, such as lighting (e.g., sunlight, artificial lighting, etc.) and the natural characteristics of the flower itself. For example, creases and/or wrinkles in the flower petals can block light and cause shadows which make the creases/wrinkles appear darker. In another example, the flower 108 can naturally have brighter colors in certain areas than in others. Whether all of the miniscule details of the flower 108 can be captured in an image or not will depend at least in part on the type, quality, and/or setting(s), etc., of the camera 104.

In some embodiments, the camera 104 can be set to an automatic exposure mode. Exposure can refer to the total amount of light allowed to fall on the photographic medium (e.g., photographic film, image sensor, etc.) during the process of taking a photograph. In some embodiments, when the camera 104 is in automatic exposure mode, it can automatically calculate and adjust exposure settings in an attempt to match (e.g., as closely as possible) the mid-tone of a subject to be photographed to the mid-tone of the photograph.

In some embodiments, exposure can be controlled by the shutter speed of the camera 104. The shutter can control the amount of light that passes into the camera lens. When the shutter is open, light can come into the camera lens; when the shutter is closed, light cannot come into the camera lens. In some embodiments, the (camera 104 of the) computing device 102 can have a virtual shutter (e.g., whether or not the camera lens "sees" light is controlled by software). In some embodiments, the (camera 104 of the) computing device 102 can have a physical shutter. Shutter speed can refer to the amount of time the photographic medium is exposed. A faster shutter speed can result in a shorter exposure and a slower shutter speed can result in a longer exposure. The longer the exposure, the more amount of light is allowed to fall on the photographic medium; the shorter the exposure, the lesser the amount of light. As such, in some embodiments, the darkness/brightness level of photographs to be taken can be adjustable by varying the exposure time and/or shutter speed.

In some embodiments, the user 110 can utilize (the camera 104 of) the computing device 102 to take one or more high dynamic range (HDR) images. High dynamic range (HDR) photography can allow for a greater dynamic range (i.e., the luminance range of a scene being photographed) between the lightest and darkest areas of an image than current standard digital imaging or photographic methods. In other words, an HDR image can capture both the lighter and the darker areas of an image whereas a non-HDR ("standard") image typically does not. In non-HDR photography (i.e., "standard photography," "low dynamic range (LDR) photography"), a photograph is taken at a single exposure level with a limited contrast range (i.e., dynamic range), which can result in loss of detail in bright and/or dark areas of a subject in the photograph, depending on whether the camera had a low or high exposure setting. In sonic embodiments, HDR photography compensates for loss of detail in bright/dark areas by taking multiple pictures at different exposure levels and intelligently combining the multiple pictures together to produce a picture that is representative in both dark and bright areas.

In some embodiments, HDR photographs can be achieved by capturing multiple standard photographs at different exposures (e.g., using exposure bracketing) and then combining the multiple standard photographs into an HDR image. In some embodiments, the multiple standard photographs (i.e., plurality of images) are not shown to the user. In some embodiments, the (camera 104 of the) computing device 102 can have an auto exposure bracketing (AEB) feature. For example, the AEB feature can allow the device 102 to take several successive shots (at the same subject), each shot having a different exposure setting; the shots can then be automatically combined into one HDR image which can contain the different details captured using the different exposure settings. It is also contemplated that one of ordinary skill in the art would know various other methods and/or ways to achieve HDR photography.

Figure 2A:
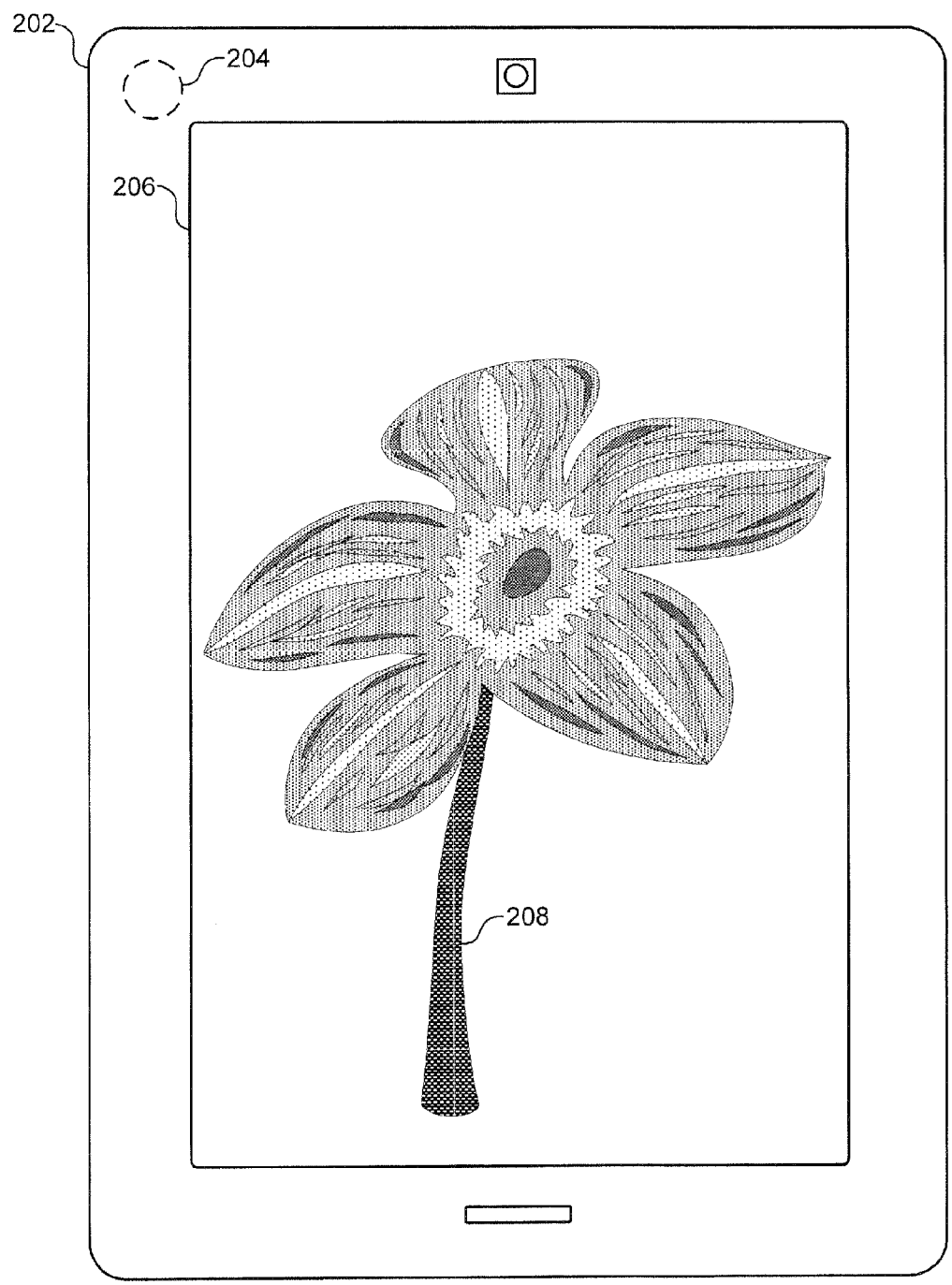
FIG. 2A illustrates an example device embodiment for delayed data processing.

FIG. 2A illustrates an example device embodiment for delayed data processing. The example device embodiment 202 of FIG. 2A can comprise at least one camera 204 and a display screen 206. In FIG. 2A, the display screen 206 of the device 202 shows an example "normal" or "standard" (i.e., non-HDR) picture 208 of the flower 108 in FIG. 1. For example, the picture 208 of the flower is normal/standard because the computing device 202 can have calculated and adjusted exposure settings in an attempt to match the mid-tone of the flower to the mid-tone of the picture. As such, the light and dark regions of the flower in the picture 208 may not be as obvious and/or intense as they would appear in an HDR image. In some embodiments, the normal/standard picture 208 can depict more accurately what a human eye would see at the time of taking the photo.

Figure 2B:
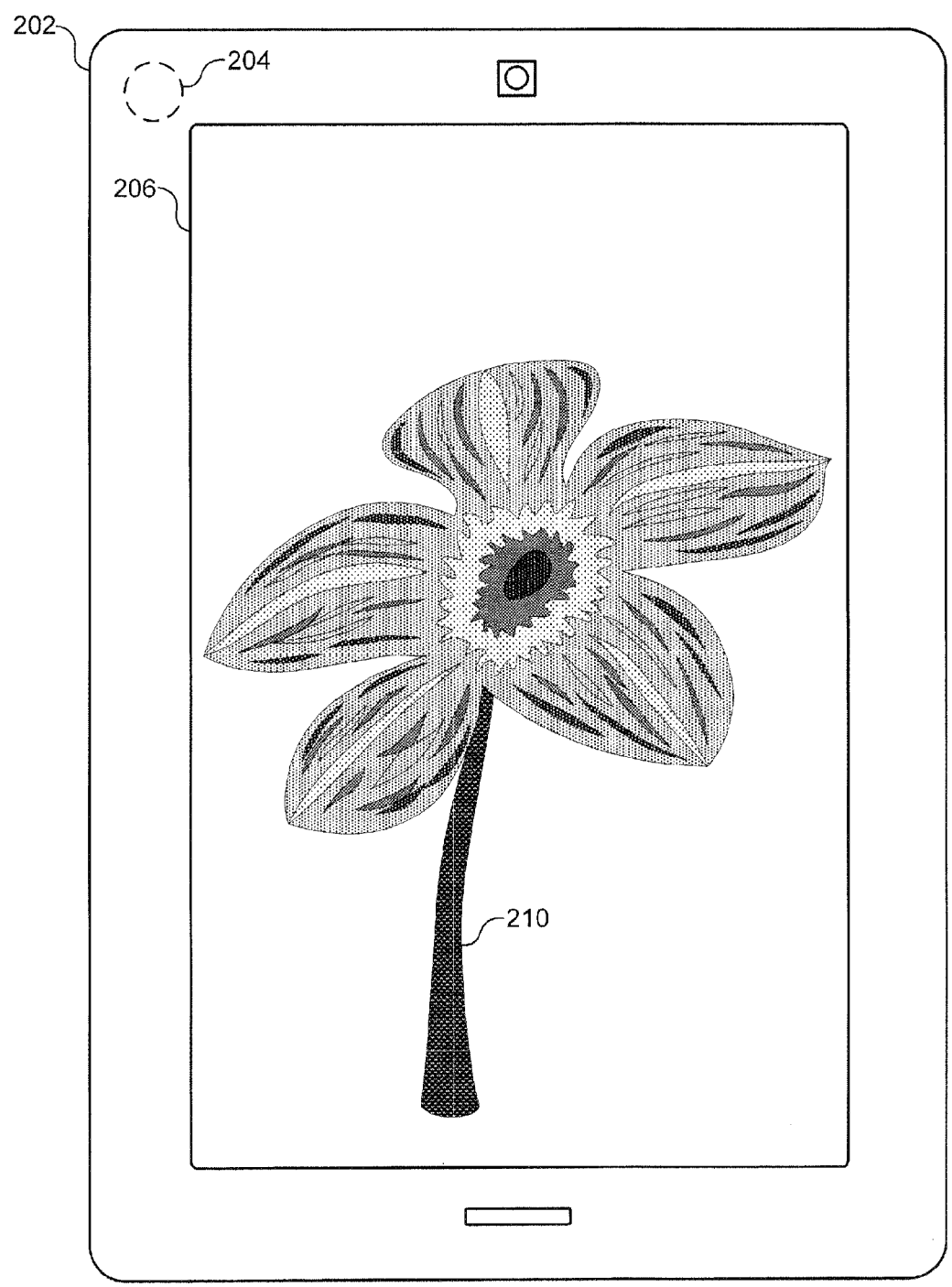
FIG. 2B illustrates an example device embodiment for delayed data processing.

FIG. 2B illustrates an example device embodiment for delayed data processing. As discussed above, an HDR image can be created by taking several successive shots of the same subject (e.g., the flower 108), wherein each of the successive shots has a different exposure setting. FIG. 2B shows an example picture 210 of the flower, which can be one of the plurality of images (i.e., one of the successive shots) used to form an HDR image. The example picture 210 is taken with a low exposure setting (e.g., fast shutter speed, low exposure time). Due to the low exposure, the flower in the picture 210 of FIG. 2B can appear darker. The low exposure setting can let in less light at the photographic medium (e.g., film, image sensor). As a result, dark regions of the flower in the picture 210 can be darker and the light regions of the flower in the picture 210 can be darker as well. In contrast to the normal/standard picture 208 of FIG. 2A, the picture 210 of FIG. 2B appears darker overall.

Figure 2C:
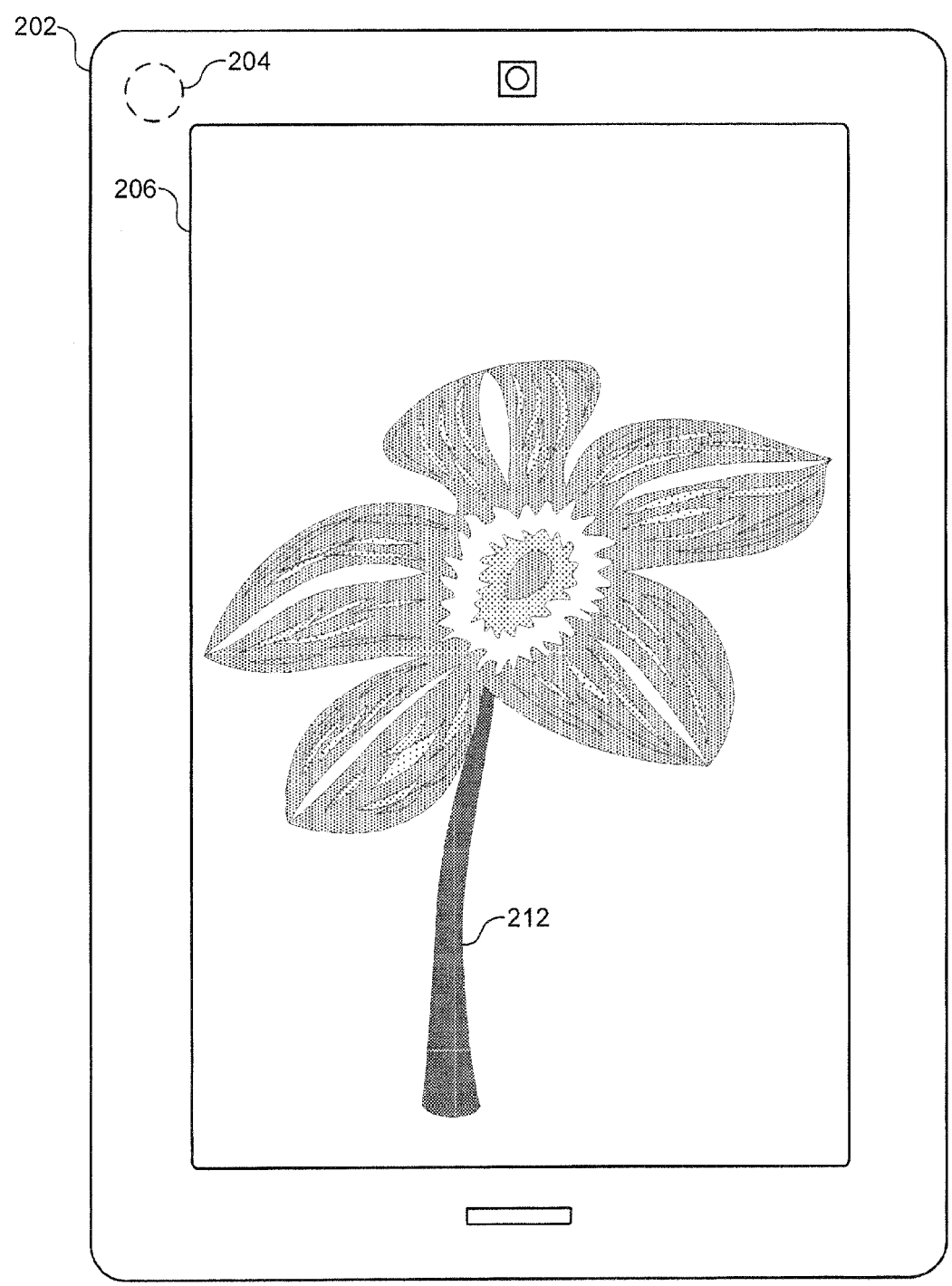
FIG. 2C illustrates an example device embodiment for delayed data processing.

FIG. 2C illustrates an example device embodiment for delayed data processing. In FIG. 2C, there is another example picture 212 of the flower 108, which can also be one of the plurality of images (i.e., one of the successive shots) used to form an HDR image. The example picture 212 is taken with a high exposure setting (e.g., slow shutter speed, high exposure time). Due to the high exposure, the flower in the picture 212 of FIG. 2C can appear lighter (i.e., brighter). The high exposure setting can let in more light at the photographic medium (e.g., film, image sensor). As a result, light regions of the flower in the picture 212 can be lighter and the dark regions of the flower in the picture 212 can be lighter as well. In contrast to the normal/standard picture 208 of FIG. 2A and to the darker picture 210 of FIG. 2B, the picture 212 of FIG. 2C appears lighter/brighter overall.

Figure 2D:
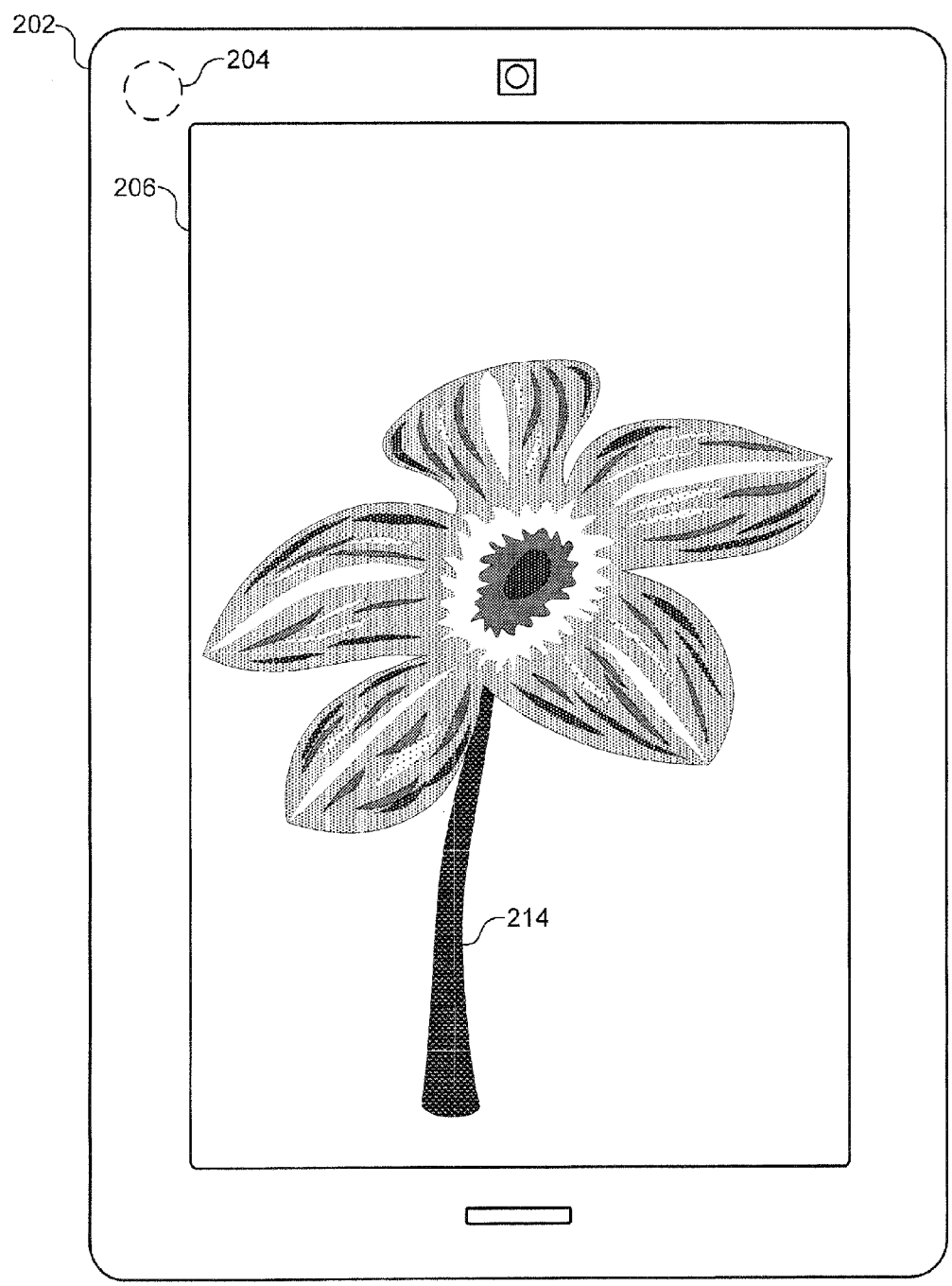
FIG. 2D illustrates an example device embodiment for delayed data processing.

FIG. 2D illustrates an example device embodiment for delayed data processing. FIG. 2D shows an example HDR picture 214 of the flower 108 of FIG. 1. In some embodiments, the HDR picture 214 can be formed by combining at least the picture 210 of FIG. 2B and the picture 212 of FIG. 2C (i.e., plurality of images, successive shots). For example, the computing device 202 can generate the HDR picture 214 by combining the dark regions of the flower in the dark picture 210 and the bright regions of the flower in the bright picture 212. In other words, the computing device 202 can stitch together the darker areas of picture 210 and the lighter areas of picture 212 to form the HDR picture 214, which has a high contrast range showing both the lightest regions as well as the darkest regions of the flower.

In some embodiments, the processing time and/or resources needed for analyzing and combining the plurality of images (e.g., picture 210, picture 212, etc.) to form an HDR image (e.g., picture 214) can be large. Accordingly, in some embodiments, the processing (e.g., analyzing, combining, etc.) of the plurality of images can be delayed. For example, the processing of the image data (e.g., analyzing and/or combining the plurality of images) can be performed at a time when the camera 204 of the device 202 has a low probability of being used and/or at a time when the device 202 has the resources needed to perform the image data processing (e.g., when there is low CPU utilization).

Figure 3:
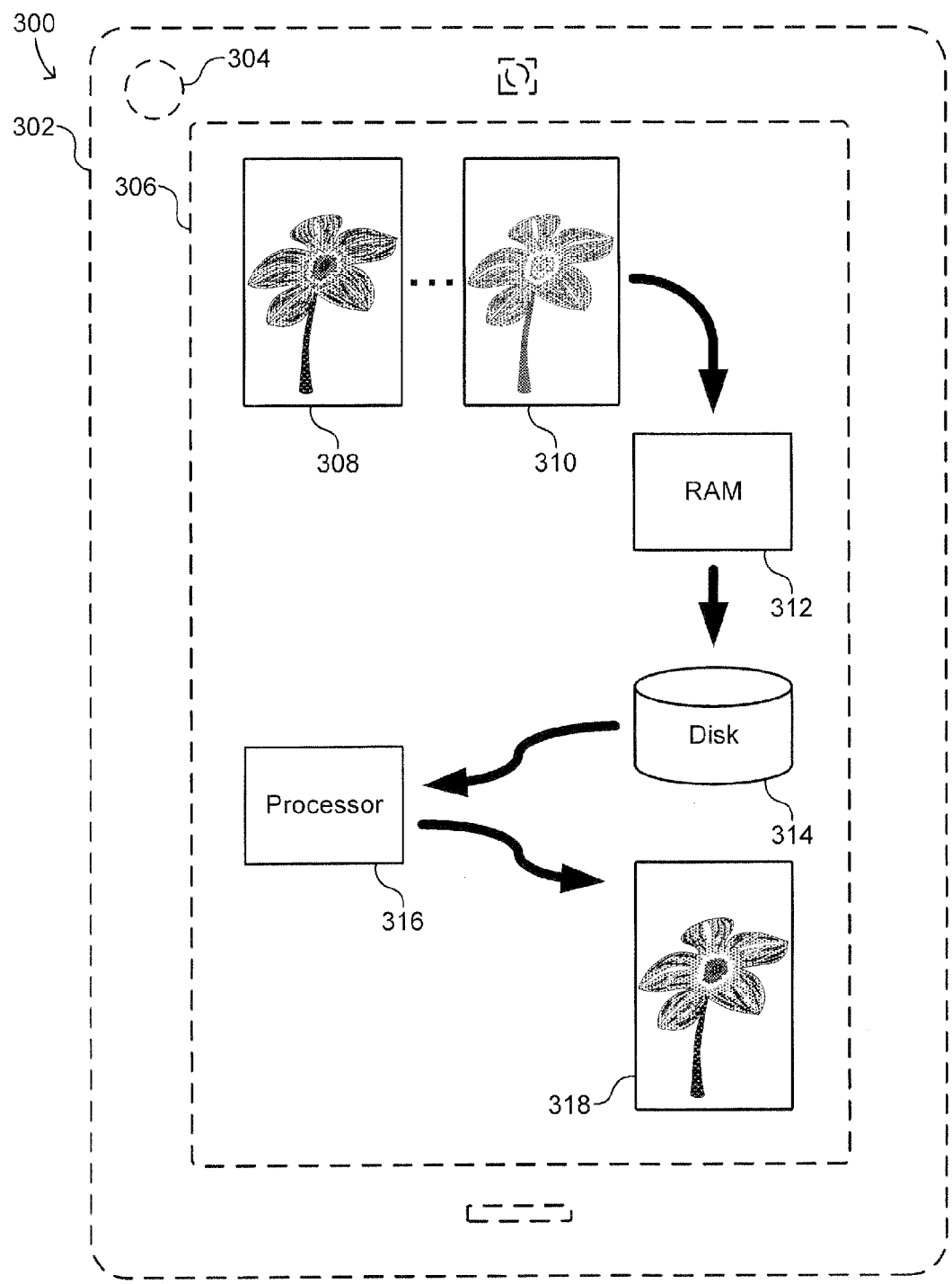
FIG. 3 illustrates an example device embodiment for delayed data processing.

FIG. 3 illustrates an example device embodiment for delayed data processing. The example device embodiment 300 can comprise a computing device 302 which includes at least one camera 304 and a display screen 306. In some embodiments, a plurality of normal/standard (e.g., non-HDR) images (e.g., 308, 310, etc.) can be taken by the at least one camera 304 of the computing device embodiment 302. For example, at least a non-HDR image at a low exposure 308 and a non-HDR image at a high exposure 310 can be taken in succession by the camera 304 of the device 302. As a result, the low exposure image 308 can capture the dark details (e.g., shadow details) while the high exposure image 310 can capture the bright details (e.g., highlight details). The images 308 and 310 can be taken as successive shots in a short period of time such that the subject (e.g., flower 108) of the photograph remains the same (or as close to being the same as possible) while each image is taken.

The plurality of images (e.g., 308, 310, etc.) can be stored, at least temporarily, into random access memory (RAM) 312 of the computing device 302. In some embodiments, as shown in FIG. 3, the plurality of images can be written to disk 314 (e.g., a hard disk drive of the device 302). The plurality of images can thus be saved on disk 314 and be processed to generate an HDR image at a subsequent time. As such, the computing device 302 (and camera 304) can be freed up for use to take more pictures (e.g., the camera 304 remains responsive after capturing the plurality of images for forming an HDR image) or perform other tasks.

The computing device 302 can determine a time subsequent to the capturing of the images at which to process the captured images to form the HDR image. In some embodiments, the computing device 302 can determine a time at which the device 302 has sufficient resources to process the images based on device usage data (i.e., information about how the device 302 is being used, information about when the device 302 is being used, information about device component usage, information about application usage on the device, etc.). In some embodiments, the computing device 302 can determine a time at which there is a low likelihood of the camera 304 being used. For example, the device 302 can take into consideration information about camera usage, such as whether the camera 304 is currently being used (e.g., via a camera app, photo app, etc.), how long it has been since the camera 304 was last used, historical data regarding use of the camera 304, and/or other various information relating to use of the camera 304. Similarly, the device 302 can take into consideration information photography application usage, including whether a photo application uses the camera 304, whether the photo application is being used, historical data regarding use of the photo application, etc. In another example, the device 304 can check the current state of the device 304 (e.g., whether it is idle, whether it is in a locked-screen state, etc.), the time and date, and/or other information; for example, if the device 302 is idle, in a locked-screen state, and the time/date is early Monday morning at 4:00 AM, then there can be a low probability for current and/or (near) future use of the camera 304.

In some embodiments, the computing device 302 can check whether it has resources available to process the plurality of images. For example, additionally or alternatively to checking when the camera 304 is not in use, the device 302 can also check to see whether it currently has the processing power to analyze and combine the plurality of images (e.g., 308, 310, etc.) to form an HDR image. As discussed previously, the device 302 can check whether it has any processes running (in the foreground and/or background), whether it is idle, whether it has any queued tasks, whether it is in a locked-screen state, the time and date, and/or other information to determine whether it can handle the processing of the images. As such, the appropriate time can be determined to be a time when the camera 304 is not in use and/or when the computing device 302 has sufficient resources (e.g., processing power, battery life, etc.) to process the plurality of images.

At the determined time, the plurality of images can be processed. In some embodiments, the processing can be performed in the background. In some embodiments, the processing can be performed as a foreground task. The processing can be facilitated by one or more processors 316 of the device 302, as shown in FIG. 3. For example, the plurality of images can be analyzed to determine which image is the lightest at a particular area and which image is the darkest at another particular area. With reference to the flowers in FIG. 3, for example, it can be determined that the streaks near the outer edges of the petals are the darkest in image 308 while the streaks in the middle of the petals are the lightest in image 310. Accordingly, based at least in part upon combining the dark streaks near the outer edges of the petals (and other dark areas such as the stem) from image 308 and the light steaks in the middle of the petals (and other light areas) from image 310, an HDR image 318 can be formed such that the HDR image 318 contains a wide contrast range including the darkest and lightest regions (and other regions in between) from the plurality of images (e.g., 308, 310, etc.). It is also contemplated that a person of ordinary skill in the art would understand that additional images with different exposures can be utilized in generating the HDR image 318.

Figure 4:
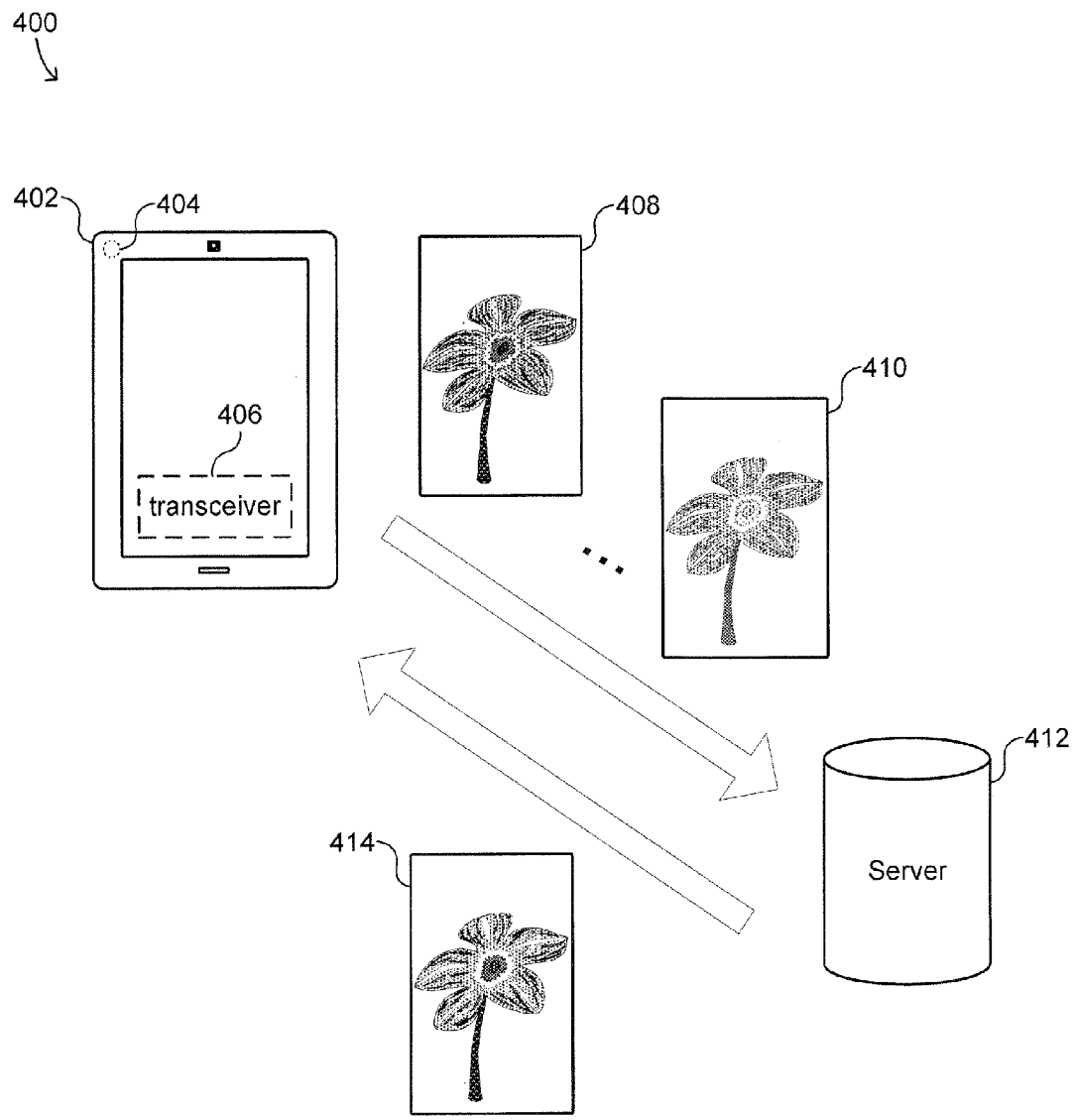
FIG. 4 illustrates an example system embodiment for delayed data processing.

FIG. 4 illustrates an example system embodiment for delayed data processing. The example system embodiment 400 can comprise a computing device 402 and a server 412 external to the computing device 402. The computing device 402 can comprise at least one camera 404 and a transceiver 406. The at least one camera 404 can capture a plurality of images (e.g., 408, 410, etc.), each of which can be captured at a different exposure setting. For example, image 408 can be captured at a low exposure setting, resulting in the image 408 being dark (and containing dark details) whereas image 410 can be captured at a high exposure setting, resulting in the image 410 being light (and containing light details).

In some embodiments, the plurality of images (e.g., 408, 410, etc.) can be transmitted by the transceiver 406 on the computing device 402 to a server 412 external to the device 402 (e.g., cloud server, another computing device, etc.). For example, the images (e.g., 408, 410, etc.) can be transmitted via one or more wired and/or wireless networks to the server 412. In some embodiments, the images can be stored in memory, at least temporarily, on the device 402 and then transmitted to the server 412. In some embodiments, the transmission of the images to the server 412 can free up the computing device 402 from having to process the images to form an HDR image. For example, after transmitting the images to the server 412, the computing device 402 can be used right away to take additional photographs (e.g., the camera 404 remains responsive after capturing the plurality of images for forming an HDR image) or perform other tasks.

The server 412 can receive the plurality of images (e.g., 408, 410, etc.). In some embodiments, the server 412 can determine an appropriate time at which to process the images and generate an HDR image 414 (e.g., when the server 412 determines that it has sufficient resources to process the images to generate the HDR image 414). In some embodiments, at the determined time, the server 412 can process (e.g., analyze, combine, etc.) the plurality of images to generate the HDR image 414. The generated HDR image 414 can be transmitted by the server 412 back to the computing device 402. As discussed previously, since the processing of the images can be performed on the server 412, the computing device 402 need not process the images by itself to form the HDR image 414, which can be a computationally intensive task. Instead, after transmitting the images to the server 412, the computing device 402 can be used right away to take additional photographs or perform other tasks. When the plurality of images have been processed and the HDR image 414 has been generated by the server 412, the computing device 402 can receive the HDR image 414 from the server 412.

In some embodiments, the server 412 can send the HDR image 414 with lower resolution at first; then as the server 412 transmits more data, the HDR image 414 can have higher resolution (e.g., such as the case with the loading of maps in online mapping applications).

Figure 5:
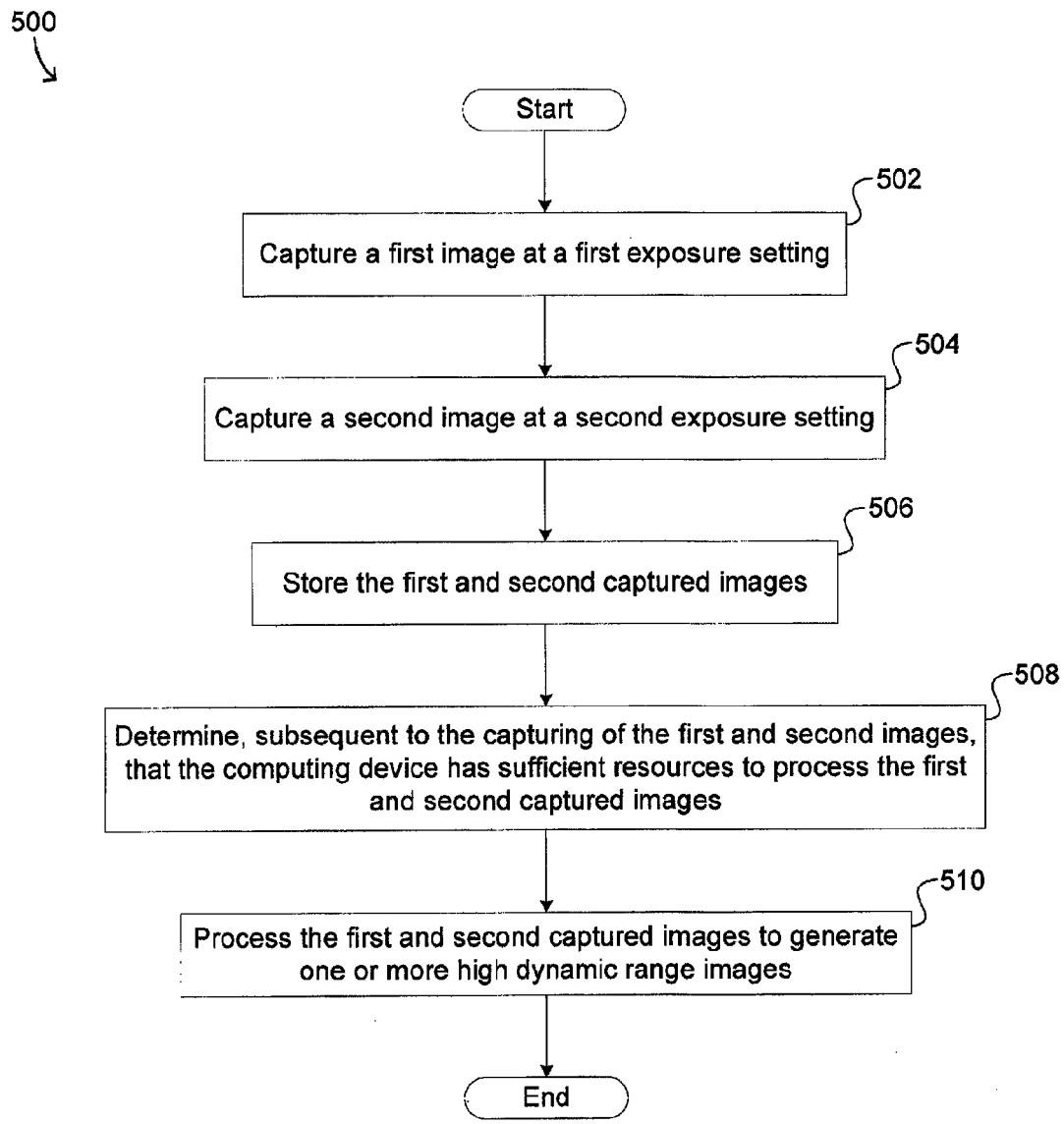
FIG. 5 illustrates an example method embodiment for delayed data processing.

FIG. 5 illustrates an example method embodiment for delayed data processing. It should be understood that there can be additional, fewer, or alternative steps performed in similar or alternative orders, or in parallel, within the scope of the various embodiments unless otherwise stated. The example method embodiment 500 can start with capturing a first image using a camera on a computing device, at step 502. The camera can be set at a first exposure setting which causes at least a first portion of a subject in the first captured image to have a first brightness level. For example, the camera can be set at a low exposure setting, which can cause a shadow detail in the first image to have a very dark brightness level.

At step 504, the example method 500 can capture a second image using the camera. The camera can be set at a second exposure setting causing at least a second portion of a subject in the second captured image to have a second brightness level different from the first brightness level. For example, the camera can be set at a high exposure setting, which can cause a highlight detail in the second image to have a very light brightness level. Moreover, the subjects in the first and second captured images can be the same subject (e.g., the same flower, the same person, the same scene, the same view, etc.). Also, the first and second portions of the subject can be different portions of the subject (e.g., different areas on a flower petal, different body parts of a person, different parts of a scene, etc.).

The example method 500 can store the first and second captured images in a memory device on the computing device, at step 506. In some embodiments, the method 500 can store, at least temporarily the captured images in RAM. In some embodiments, the method 500 can store the images in a hard disk drive of the device.

At step 508, the method 500 can determine, subsequent to the capturing of the first and second images, that the computing device has sufficient resources to process at least the first and second captured images. For example, the time can be when the device is in a locked-screen state and when there is low CPU utilization, and/or a time at which the camera has a low likelihood of being used.

The method 500 can process, when the computing device has sufficient resources, at least the first and second captured images to generate one or more high dynamic range images, at step 510. The processing of the images to generate the one or more HDR images can be based at least in part upon combining (e.g., conjoining, adjoining, etc.) at least an image representation of the first portion of the subject in the first captured image and an image representation of the second portion of the subject in the second captured image. For example, one or more HDR images can be formed at least in part by stitching together a dark shadow detail from the first image and a bright highlight detail from the second image.

Figure 6:
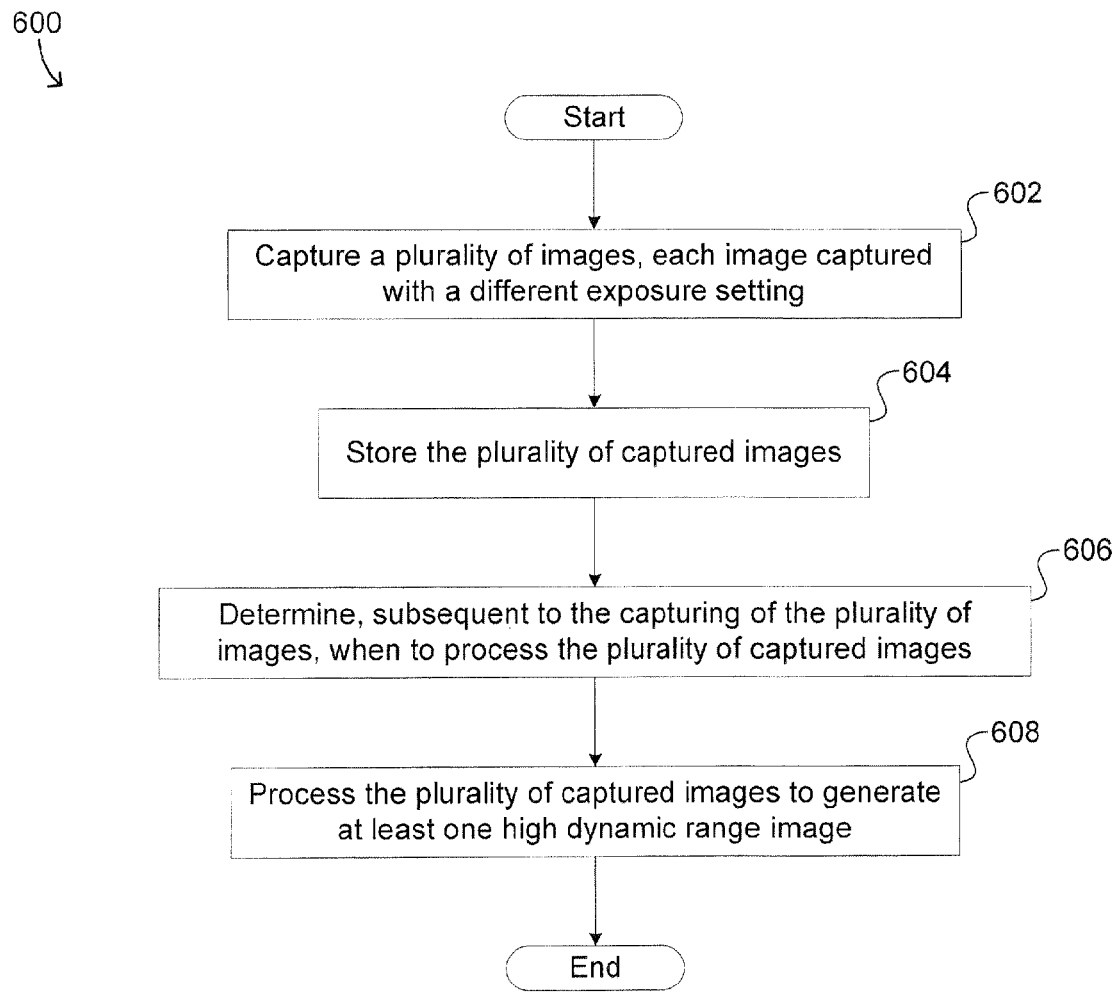
FIG. 6 illustrates an example method embodiment for delayed data processing.

FIG. 6 illustrates an example method embodiment 600 for delayed data processing. Again, it should be understood that there can be additional, fewer, or alternative steps performed in similar or alternative orders, or in parallel, within the scope of the various embodiments unless otherwise stated. At step 602, the example method embodiment 600 can capture a plurality of images using a camera on a computing device. Each of the plurality of images can be captured with a different exposure setting. Step 604 involves storing the plurality of captured images in a memory device on the computing device.

The example method 600 can determine, subsequent to the capturing of the plurality of images, when to process the plurality of captured images, at step 606. The determining of when to process the plurality of images can be based at least in part upon utilizing usage data about the computing device. The method 600 can process the plurality of images to generate at least one high dynamic range image, at step 608. The processing of the images to generate the at least one HDR image can be based at least in part upon combining at least an image representation of a portion of a first image from the plurality of captured images and an image representation of a portion of a second image from the plurality of captured images.

In some embodiments, if the user attempts to view the HDR image right after capturing the plurality of images, he/she can be presented with an hourglass, a wait cursor, text such as "In Progress," or other similar notifications. In some embodiments, the user can have the option to enable the computing device to process the plurality of images right away after capturing them in order to generate the HDR image.

In some embodiments, the procedure for forming/generating the HDR image can be presented, such as to the user of the computing device for entertainment and/or status measuring purposes. For example, a black and white (or grayscale) image with a middle-level exposure (e.g., a normal/standard exposure) can be displayed on the display screen, after which pixels from the other images with different exposures can appear, eventually forming the HDR image. In some embodiments, the user can choose to view the non-processed (e.g., raw) plurality of images used to form the HDR image.

In some embodiments, the user can be presented with one or more configuration options. For example, the user can choose how to store/process the plurality of images. For example, the user can choose to always transmit the images to the server for storing and/or processing when the device is connected to WiFi (as opposed to a cellular data network), to always store the images to disk as long as there is sufficient disk space, and/or to only process the images when there is sufficient battery life, etc.

In some embodiments, the computing device can automatically determine how many images of a subject need to be captured to form an HDR image of the subject. For example, the computing device can use a light meter/sensor to determine how much light is reflecting off the subject and/or can be captured by the camera. In some embodiments, the computing device can use a compass, calendar, clock, accelerometer, gyroscope, location data, etc., to facilitate in determining how much light (e.g., sunlight) is present. In some embodiments, the technology disclose can determine a quantity of images in the plurality of images to be processed to generate the at least one high dynamic range image, wherein the determining of the quantity utilizes data about at least one of a light sensor of the computing device, a compass of the computing device, a calendar of the computing device, a clock of the computing device, an accelerometer of the computing device, a gyroscope of the computing device, or location data of the computing device.

In some embodiments, the plurality of images are captured in rapid succession by the camera of the computing device so that the subject (e.g., item, person, scene, view, etc.) of the images appears the same (or as close as possible to being the same) in each image. In some embodiments, the plurality of images can come from different users, cameras, and/or devices to form the HDR image, assuming that the images are similar enough (e.g., the subjects in the images are similar enough).

Various embodiments consistent with the present disclosure can also be implemented for other types of data, such as for audio data. For example, delayed data processing can be implemented for voice transcription; the user can record his/her voice reading text, which can then be processed (e.g., transcribed into text) at a later time. In another example, audio and/or images (including video) can be recorded by the computing device and the audio/image data can be processed at a subsequent time (e.g., noise cancellation for the audio and/or image enhancement for image/video can be applied at later time).

Figure 7:
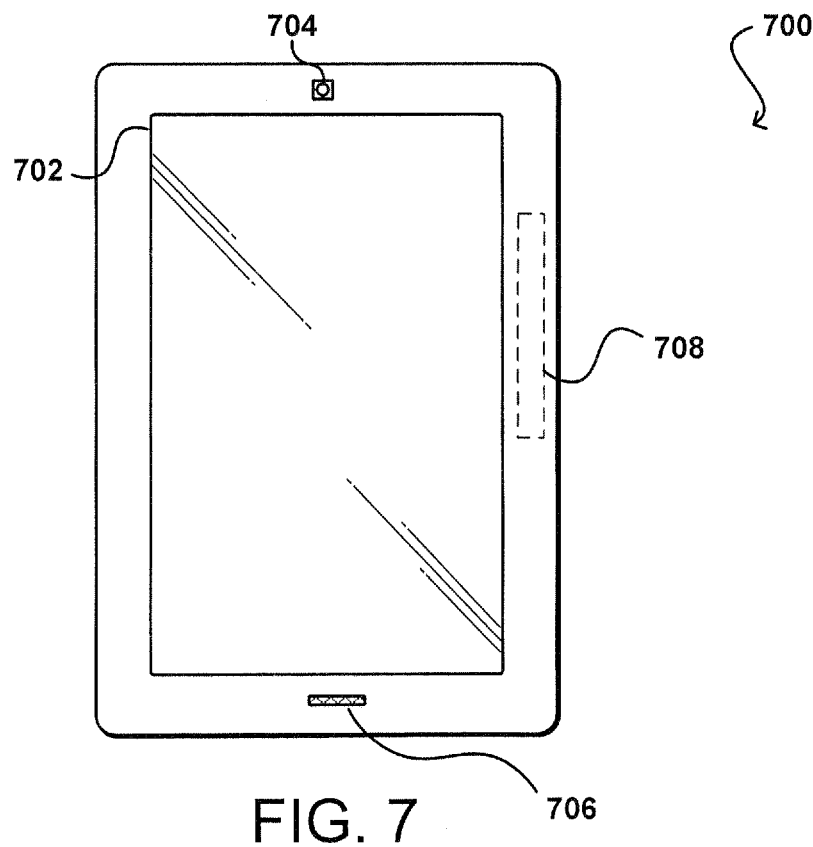
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
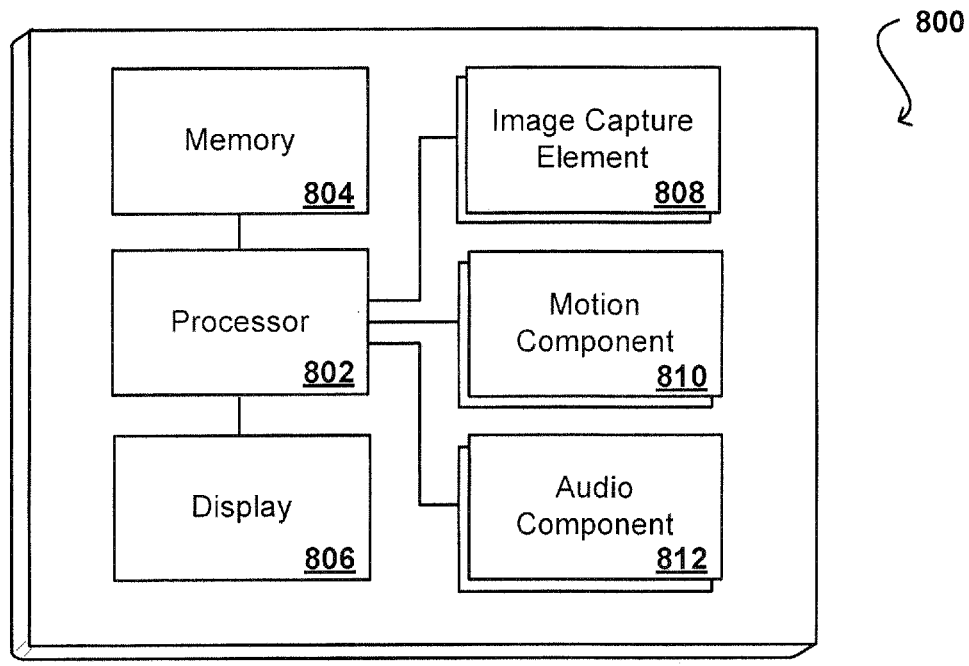
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
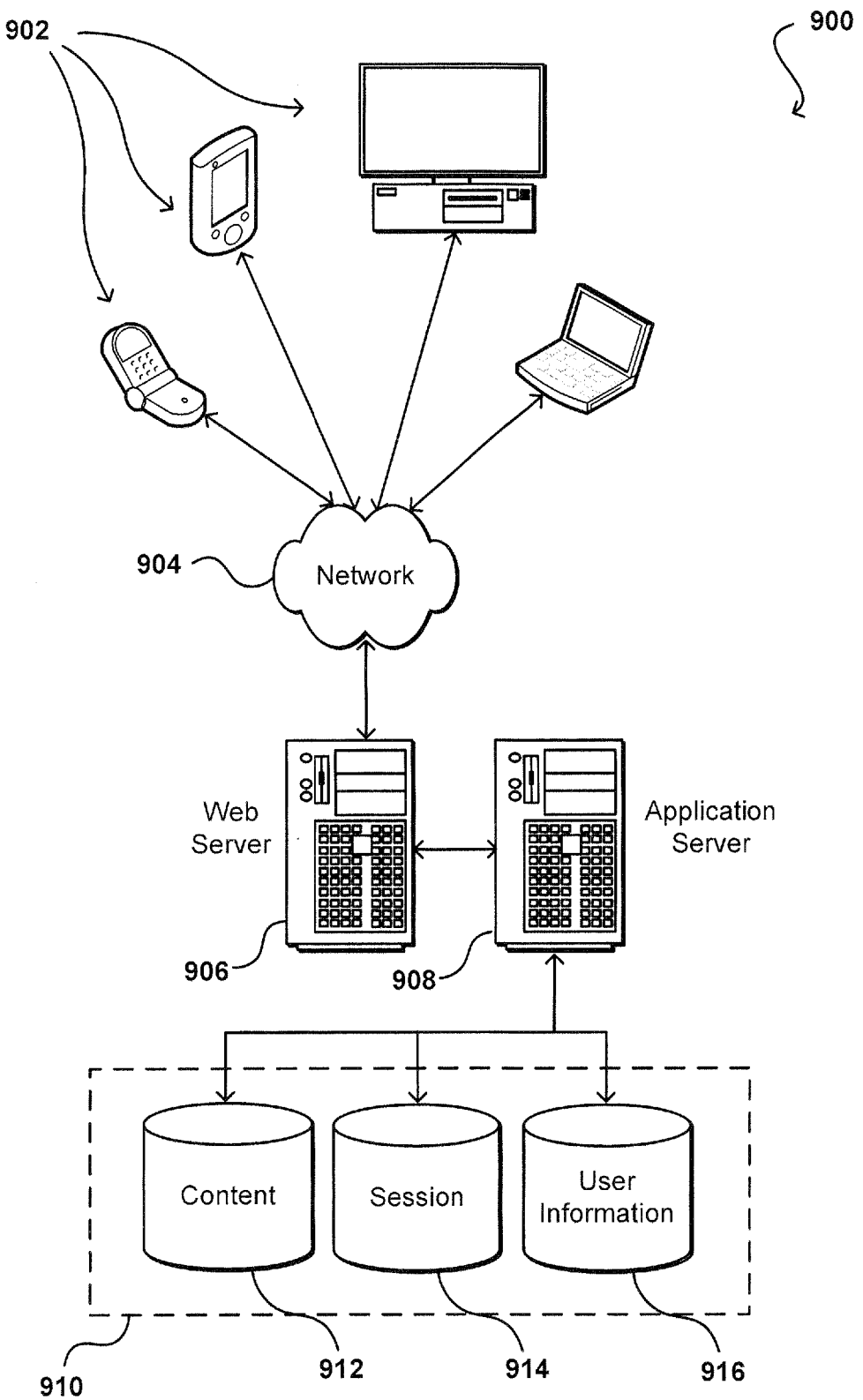
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   determining, based at least on a user input, a timing selection for high dynamic range image processing, the timing selection representing at least: immediate processing, and delayed processing;
   determining that the timing selection represents delayed processing;
   capturing, during a first time period, a plurality of images using a camera on a computing device, the plurality of images captured with one or more different exposure settings, the plurality of images for use in generating at least one high dynamic range image;
   storing the plurality of images in a memory device on the computing device;
   determining, at a second time subsequent to the first time period, to process the plurality of images to generate the at least one high dynamic range image using at least an image representation of a portion of a first image from the plurality of images and an image representation of a portion of a second image from the plurality of images the determining at the second time based at least in part on determining that the computing device is not being used, or not likely to be used; and
   displaying the at least one high dynamic range image on a display screen of the computing device.

2. The computer-implemented method of claim 1, further comprising:
   capturing at least one additional image subsequent to storing the plurality of images in the memory device and prior to processing the plurality of images to generate the at least one high dynamic range image, wherein the at least one high dynamic range image further includes a portion of the at least one additional image.

3. The computer-implemented method of claim 1, further comprising:
   displaying on the display screen, based at least in part upon one or more user commands, a timing notification illustrative of a processing state of the at least one high dynamic range image being generated.

4. The computer-implemented method of claim 1, wherein determining at the second time is further based at least in part on detecting one or more user commands to initiate processing of the plurality of images to generate the at least one high dynamic range image.

5. The computer-implemented method of claim 1, further comprising:
   determining a quantity of images in the plurality of images to be processed to generate the at least one high dynamic range image utilizing data from at least one of a light sensor of the computing device, a compass of the computing device, a calendar of the computing device, a clock of the computing device, or location data of the computing device.

6. The computer-implemented method of claim 1, further comprising:
   receiving an additional image from another computing device, wherein the at least one high dynamic range image further includes an image representation of a portion of the additional image.

7. The computer-implemented method of claim 1, further comprising:
   determining, at a third time prior to the second time and based at least in part upon queued and running CPU processing tasks during the first time period, that the computing device does not have sufficient available processing capacity to process the plurality of images.

8. The computer-implemented method of claim 1, further comprising:
   displaying at least one image from the plurality of images on a display screen of the computing device prior to processing the plurality of images to generate the at least one high dynamic range image.

9. A computing device comprising:
a camera;
a display screen;
a processor; and
a memory device including instructions that, when executed by the processor, cause the computing device to:
determine, based at least on a user input, a timing selection for high dynamic range image processing, the timing selection representing at least: immediate processing, and delayed processing;
determine that the timing selection represents delayed processing;
capture, during a first time period, a plurality of images using the camera, the plurality of images captured with one or more different exposure settings, the plurality of images for use in generating at least one high dynamic range image;
store the plurality of images in the memory device;
determine, at a second time subsequent to the first time period, to process the plurality of images to generate the at least one high dynamic range image using at least an image representation of a portion of a first image from the plurality of images and an image representation of a portion of a second image from the plurality of images, the determining at the second time based at least in part on determining that the computing device is not being used, or not likely to be used; and
display the at least one high dynamic range image on the display screen of the computing device.

10. The computing device of claim 9, wherein the memory device further includes instructions that, when executed by the processor, cause the computing device to:
display, based at least in part upon one or more user commands, a timing notification illustrative of a processing state of the at least one high dynamic range image being generated.

11. A non-transitory computer-readable storage medium including instructions for identifying elements, the instructions when executed by a processor of a computing device causing the computing device to:
determine, based at least on a user input, a timing selection for high dynamic range image processing, the timing selection representing at least: immediate processing, and delayed processing;
determine that the timing selection represents delayed processing;
capture, during a first time period, a plurality of images using a camera on a computing device, the plurality of images captured with one or more different exposure settings, the plurality of images for use in generating at least one high dynamic range image;
store the plurality of images in a memory device on the computing device;
determine, at a second time subsequent to the first time period, to process the plurality of images to generate the at least one high dynamic range image using at least an image representation of a portion of a first image from the plurality of images and an image representation of a portion of a second image from the plurality of images, the determining at the second time based at least in part on determining that the computing device is not being used, or not likely to be used; and
display the at least one high dynamic range image on a display screen of the computing device.

12. The non-transitory computer-readable storage medium of claim 11, wherein the instructions cause the computing device to further:
capture at least one additional image subsequent to the plurality of images being stored and prior to the plurality of images being processed, wherein the at least one high dynamic range image further includes a portion of the at least one additional image.

13. The non-transitory computer-readable storage medium of claim 11, wherein instructions when executed by the processor cause the computing device to further:
detect one or more user commands to initiate generation of the at least one high dynamic range image.

14. The non-transitory computer-readable storage medium of claim 11, wherein the instructions when executed by the processor cause the computing device to further determine a quantity of images in the plurality of images to be processed to generate the at least one high dynamic range image utilizing data from at least one of a light sensor of the computing device, a compass of the computing device, a calendar of the computing device, a clock of the computing device, or location data of the computing device.

15. The non-transitory computer-readable storage medium of claim 11, wherein the instructions when executed by the processor cause the computing device to further receive an image from another computing device, wherein the processing the plurality of images to generate the at least one high dynamic range image includes processing the received image to generate the at least one high dynamic range image.

* * * * *